Patented July 10, 1951

2,559,585

UNITED STATES PATENT OFFICE 2,559,585

PREPARATION OF SULFONIC ACID COMPOUNDS

Lloyd W. Beck and Alfred R. Gilbert, United States Navy, and John K. Wolfe, Bethesda, Md.

No Drawing. Application February 20, 1946, Serial No. 649,102

5 Claims. (Cl. 260—513)

(Granted under the act of March 3, 1883, as amended April 30, 1928; 370 O. G. 757)

Our invention relates to a process for the preparation of sulfonates and more particularly to a process especially suited to the preparation of secondary and tertiary sulfonates by reaction in a non-aqueous medium.

An object of our invention is to provide a method for sulfonate production whereby the product is prepared in a non-aqueous medium, thus eliminating difficulties encountered in common processes for making sulfonates.

Since many specialized applications require sulfonates in substantially pure anhydrous form, it is another object of our invention to provide a method for synthesizing and isolating substantially anhydrous and pure sulfonates.

Other objects and advantages of our invention will in part be obvious and in part appear hereinafter in our description of the details of the process and the preparation of sulfonates according to the several reactions involved.

Our invention comprises a process for converting an isothiouronium salt of a particular alkyl or substituted alkyl compound to the corresponding sulfonate by way of the mercaptan, which process involves reacting the isothiouronium salt with an ammoniacal base in a non-aqueous medium and oxidizing the mercaptan thus produced to the corresponding sulfonate by reaction with nitrogen dioxide or nitrogen tetroxide. Accordingly our invention includes the combination and sequence of steps and relationship of the several steps each to the other which will be hereinafter described, and the scope of the invention is not to be limited other than as it is defined in the claims.

For purposes of convenience in the description of our invention and in the claims, the term sulfonates has been adopted to refer generically to sulfonic acids and salts of the sulfonic acids. It will be clear from the context and general description that the process is equally applicable to the preparation of sulfonic acids or salts, the salts being obtainable simply by the addition of a neutralization step at the end of the process. Alternatively, the process may be modified when it is desired to produce an alkali or alkaline earth metal salt of a sulfonic acid directly by first converting the intermediate mercaptan to a mercaptide by reacting it with an alkali metal or alkaline earth metal and thereafter oxidizing the resultant mercaptide to a sulfonate.

The chemical literature contains descriptions of several methods for the preparation of sulfonic acids and sulfonates all of which have in common the primary disadvantage of producing the sulfonate in an aqueous solution. Since sulfonates as a class are highly surface active, much frothing occurs in reactions conducted in aqueous media, and considerable difficulty is encountered both in controlling the reaction and in isolating and purifying the product.

Our method of preparing sulfonates overcomes the difficulties inherent in the above processes by conducting the entire reaction in a non-aqueous medium, employing an ammoniacal base rather than an aqueous solution of an inorganic base in producing the mercaptan or mercaptide, and oxidizing the product formed thereby to the sulfonate by the use of anhydrous nitrogen dioxide or nitrogen tetroxide. The choice of the particular oxidizing agent depends upon the temperature at which it is desired to conduct the reaction, since nitrogen tetroxide, a liquid, decomposes to gaseous nitrogen dioxide at temperatures above about 21° C. A favorable temperature range on the basis of speed of reaction is about 0° to 20° C., which indicates that the oxidation with nitrogen tetroxide is preferable.

Non-aqueous media for conducting the first phase of the process include such relatively inert solvents as benzene, toluene, carbon tetrachloride, chloroform, nitroethane, petroleum ether, and nitro and chloroparaffins generally. It is essential only that the solvent be volatile enough to permit convenient removal. Since nitrogen tetroxide is a liquid, it can be used as the solvent for the reactants in the stage of the process involving oxidation of the mercaptan or mercaptide as will be described in greater detail below.

The ammoniacal base used as the reacting agent can be ammonia or any volatile ammoniacal compound such as methyl amine, propyl amine, isopropyl amine, butyl amine, or pyridine.

In general, our process for preparing sulfonates involves the initial preparation of an isothiouronium salt, which may be formed by reacting the desired alkyl or aralkyl salt with thiourea in a non-aqueous solution, using equivalent amounts of the two compounds in accordance with the following equation:

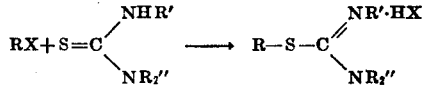

wherein R is any organic radical, X is any organic or inorganic anion, and R' and R" are any organic radicals or hydrogen. The resultant isothiouronium salt may be converted directly to the corresponding mercaptan and then to the corresponding sulfonic acid. In a similar course of reaction the mercaptan can be reacted with an alkali or alkaline earth metal to form a mercaptide which can be oxidized to the corresponding alkali metal sulfonate. This method of oxidizing the mercaptan or mercaptide is particularly effective in the production of the secondary and tertiary sulfonates.

In preparing the mercaptan, the isothiouronium salt is reacted with an ammoniacal base until the reaction is complete. The changes involved occur as follows:

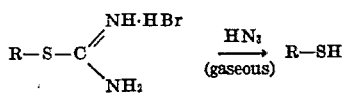

The mercaptan thus obtained is reacted with nitrogen tetroxide at a low temperature, preferably about 0° to 20° C., or nitrogen dioxide may be added to produce a sulfonic acid as follows:

$$R-SH \xrightarrow{NO_2 \text{ or } N_2O_4} RSO_3H$$

When the temperature is kept below the boiling point of nitrogen tetroxide it may itself be used both as a solvent for the mercaptan and as the oxidizing agent to convert the mercaptan to the sulfonate. In reacting the mercaptan with gaseous nitrogen dioxide the temperature may be varied up to 40° to 50° C. in effecting the completeness of the reaction.

In this preparation of mercaptides and sulfonates therefrom, the mercaptan may be reacted with an alkali or an alkaline earth metal alcoholate, for which purpose tertiary butyl alcohol has been found very satisfactory, to produce an alkali metal mercaptide as indicated by the following reaction:

$$(CH_3)_3-COK + RSH \rightarrow RSK + (CH_3)_3COH$$

The resultant mercaptide is then reacted with nitrogen dioxide or nitrogen tetroxide as described above to form the sulfonate as is indicated below:

$$RSK \xrightarrow{NO_2 \text{ or } N_2O_4} RSO_3K$$

The reaction may be carried out in the presence of a solvent or diluent such as carbon tetrachloride.

The oxidation of the mercaptans or mercaptides by the nitrogen dioxide or nitrogen tetroxide is rapid, the reaction proceeding very vigorously.

The several features of the invention as they are embodied in the process and combination of steps in the process are illustrated by the following examples, in which the quantities are stated in parts by weight, but the examples should not be construed as limiting the invention.

*Example I.—Preparation of potassium 5-ethyl-nonane-2-sulfonate*

A mixture of 76 parts of thiourea, 235 parts of 2-bromo-5-ethylnonane, and 320 parts of absolute ethanol was refluxed in a nitrogen atmosphere for 84 hours to complete the formation of the isothiouronium compound. This reaction is shown in the following approximate equation, although the exact by-products are not known:

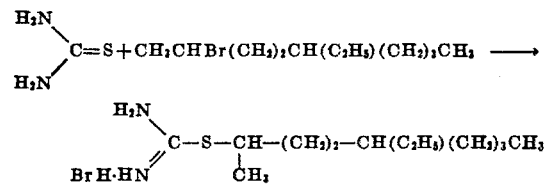

After removing the alcohol solvent by distillation under diminished pressure in a nitrogen atmosphere, the viscous isothiouronium bromide was mixed with 160 parts of dry benzene, and in order to decompose the isothiouronium bromide a stream of ammonia gas was passed through the benzene mixture at a rate of about 50 milliliters per minute. One product of the decomposition, a white solid, separated as the first ammonia entered the reaction flask. The ammonia was passed through the liquid for about 2½ hours and was followed by the passage of nitrogen through the liquid for four hours to insure the removal of dissolved ammonia, as is indicated:

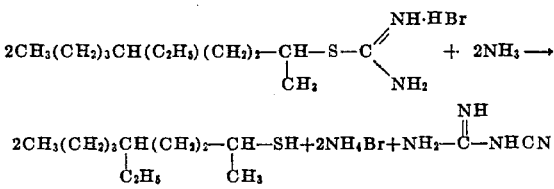

The white solid which is separated by the ammonia treatment can be recovered by filtration and washing with dry benzene and drying under diminished pressure. The filtrate can then be distilled in a nitrogen atmosphere under reduced pressure to yield pure 5-ethylnonane-2-thiol.

To form the corresponding sulfonate 6 parts of potassium tertiary butoxide dissolved in 65 parts of tertiary butyl alcohol was added to a flask containing 10 parts of 5-ethylnonane-2-thiol and equipped with a stirrer and reflux condenser. The solution was stirred for about forty-five minutes after which the flask was placed under diminished pressure in a nitrogen atmosphere and the tertiary butyl alcohol removed. The product of this reaction was a light yellow amorphous solid consisting of potassium 5-ethylnonane-2-thiol.

The flask was then equipped with a dropping funnel carrying 59 parts of liquid nitrogen tetroxide which was kept between about 0° and 5° C. by means of a Dry Ice-ether mixture in a jacket surrounding the funnel. The oxide was added over a period of two hours with stirring, while the flask was kept at a temperature between about 5° and 10° C. throughout the addition. The nitrogen tetroxide was removed by distillation under diminished pressure, leaving in the flask a yellow liquid containing some solid material. The 5 - ethylnonane - 2 - sulfonate formed in the reaction was separated by adding fifty parts of acetone to the contents of the flask, thereby precipitating nitrates formed in the reaction. The acidic acetone solution of the sulfonate thus derived was neutralized with alcoholic potassium hydroxide and the solvent removed by air distillation. A reddish-brown residue was obtained, dried at 60° C., and identified as potassium 5-ethylnonane-2-sulfonate. Although the reaction mixture was stirred vigorously at all times, during the process, no foaming occurred. The product was anhydrous and when tested in aqueous solution was found to be completely soluble in water and was a good foaming agent.

*Example II.—Preparation of N-decyl sulfonic acid*

One hundred and sixty five (165) parts of liquid nitrogen tetroxide was placed in a one liter three necked flask equipped with a glass stirrer, dropping funnel, and drying tube. The contents of the flask were kept between about 0° and 15°

C. by cooling with a Dry Ice-alcohol bath, while 50 parts of n-decyl mercaptan was added by means of the dropping funnel over a period of about two hours. As each drop of mercaptan contacted the liquid, vapors of nitrogen dioxide were evolved.

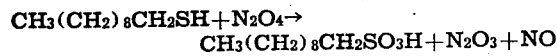
$$CH_3(CH_2)_8CH_2SH + N_2O_4 \rightarrow$$
$$CH_3(CH_2)_8CH_2SO_3H + N_2O_3 + NO$$

Near the end of the addition, a bluish solid began to collect on the bottom of the flask. After completing the addition of n-decyl mercaptan the excess nitrogen tetroxide and the gaseous oxides of nitrogen in the reaction mixture were removed from the flask by holding the system under reduced pressure for a period of about four hours. Although the contents of the flask were vigorously stirred during the reaction and considerable volatile matter escaped, no noticeable foaming occurred. A recovery of 50 parts of N-decyl sulfonic acid was obtained.

Among the sulfonates which can be produced by our process and which may be prepared as sulfonates of alkali or alkaline earth metals by the process described herein are n-decyl sulfonic acid, n-tetradecyl sulfonic acid, n-hexadecyl sulfonic acid, n-heptadecyl sulfonic acid, n-octadecyl sulfonic acid, 3,9-diethyl tridecane-6-sulfonic acid, tertiary dodecyl sulfonic acid, tertiary tetradecyl sulfonic acid, tertiary octyl sulfonic acid and phenyl octadecyl sulfonic acid. These and others of the series are readily prepared by the process described.

The invention described herein may be manufactured and used by or for the Government of the United States of America for governmental purposes without the payment of any royalties thereon or therefor.

Having described our invention, what we claim as new and desire to secure by Letters Patent of the United States is:

1. A method of preparing sulfonates which comprises reacting a compound of the group consisting of the corresponding mercaptans and mercaptides with an oxidizing agent consisting essentially of nitrogen dioxide and nitrogen tetroxide under substantially anhydrous conditions.

2. A method of preparing sulfonates which comprises dissolving a compound of the group consisting of the corresponding mercaptans and mercaptides in liquid nitrogen tetroxide and reacting it therewith under substantially anhydrous conditions.

3. A method of preparing alkyl sulfonates which comprises dissolving a compound of the group consisting of the corresponding alkyl mercaptans and alkyl mercaptides in liquid nitrogen teroxide and reacting it therewith under substantially anhydrous conditions.

4. A method of preparing alkyl sulfonic acids which comprises dissolving the corresponding alkyl mercaptan in liquid nitrogen tetroxide and reacting it therewith under substantially anhydrous conditions.

5. A method of preparing alkali metal and alkaline earth metal sulfonates which comprises dissolving the corresponding mercaptide in liquid nitrogen tetroxide and reacting it therewith under substantially anhydrous conditions.

LLOYD W. BECK.
ALFRED R. GILBERT.
JOHN K. WOLFE.

REFERENCES CITED

The following references are of record in the file of this patent:

UNITED STATES PATENTS

| Number | Name | Date |
|---|---|---|
| 2,187,338 | Werntz | Jan. 16, 1940 |
| 2,231,594 | Profft et al. | Feb. 11, 1941 |
| 2,243,331 | De Simo et al. | May 27, 1941 |
| 2,298,387 | Kenyon | Oct. 13, 1942 |
| 2,433,396 | Proell | Dec. 30, 1947 |

OTHER REFERENCES

Organic Syntheses, vol. 21, 1941, pp. 36–38, Urquhart et al; published by John Wiley and Sons, Inc., N. Y.

Unit Processes in Org. Synthesis by Groggins, p. 436.